(12) United States Patent
Neumann (10) Patent No.: US 10,764,716 B2
(45) Date of Patent: Sep. 1, 2020

(54) METHOD AND SYSTEM FOR MONITORING THE POSITION OF AN OBJECT

(71) Applicant: PROEMION GmbH, Fulda (DE)

(72) Inventor: Markus Neumann, Großenlüder (DE)

(73) Assignee: PROEMION GmbH, Fulda (DE)

(*) Notice: Subject to any disclaimer, the term of this patent is extended or adjusted under 35 U.S.C. 154(b) by 0 days.

(21) Appl. No.: 16/426,284

(22) Filed: May 30, 2019

(65) Prior Publication Data

US 2019/0373408 A1 Dec. 5, 2019

(51) Int. Cl.
| G08B 1/08 | (2006.01) |
| H04W 4/02 | (2018.01) |
| H04W 4/021 | (2018.01) |
| H04W 4/029 | (2018.01) |

(52) U.S. Cl.
CPC ........... *H04W 4/023* (2013.01); *H04W 4/021* (2013.01); *H04W 4/029* (2018.02)

(58) Field of Classification Search
CPC ..... H04W 4/023; H04W 4/029; H04W 4/025; H04W 64/00
See application file for complete search history.

(56) References Cited

U.S. PATENT DOCUMENTS

| 6,342,847 | B1 | 1/2002 | Archuleta et al. | |
| 6,844,827 | B2* | 1/2005 | Flick | B60R 25/04 |
| | | | | 340/989 |
| 2004/0021567 | A1* | 2/2004 | Dunn | G01S 19/51 |
| | | | | 340/539.13 |
| 2005/0194198 | A1* | 9/2005 | Lin Chang | B60R 25/24 |
| | | | | 180/279 |
| 2012/0258734 | A1 | 10/2012 | Takahashi et al. | |

FOREIGN PATENT DOCUMENTS

EP 3401169 A1 * 11/2018 ............. B60R 25/04

OTHER PUBLICATIONS

German Patent Office, Office Action issued in DE 10 2018 112 909.2 dated Feb. 26, 2019 (7 pages).

* cited by examiner

*Primary Examiner* — Gary Lafontant
(74) *Attorney, Agent, or Firm* — Wood Herron & Evans LLP (57) ABSTRACT

A method and a system are provided for the automatic monitoring of the position of an object, such as a vehicle or other mobile equipment, including, for example, an implement or tool or of construction material and works-related material. The method includes a series of steps carried out iteratively. The steps include detecting a current position of an object to be monitored; determining a spatial distance of the detected current position from a position previously specified as a central position; checking whether the spatial distance which has been determined exceeds a predetermined distance threshold, and if this is the case, triggering a predefined functionality of the object and/or of the position monitoring system and specifying the detected current position as a central position for a subsequent iteration.

12 Claims, 4 Drawing Sheets

METHOD AND SYSTEM FOR MONITORING THE POSITION OF AN OBJECT

CROSS-REFERENCE TO RELATED APPLICATION

This application claims priority to German Patent Application Number 10 2018 112 909.2, filed May 30, 2018, the entire disclosure of which is incorporated herein by reference.

TECHNICAL FIELD

The present invention relates to a method and a system for automatically monitoring the position of an object, and more specifically, relates to automatic monitoring of a position of a vehicle or other mobile equipment, such as for example an implement or tool.

BACKGROUND

In addition to the use of security services, technical measures for monitoring the position of objects are also known, in particular geofencing, as it is referred to. "Geofencing" refers to an automated triggering of an action as a result of an imaginary boundary on the earth's surface or in the air being passed. In particular, the boundary can represent a closed area so that a distinction can be made between locations inside and outside the boundary. In particular, monitoring of an object by geofencing can be carried out in such a way that if an object to be monitored enters a spatial region or a surface region which is enclosed and hence defined by the boundary and/or if the object leaves the same, a notification is triggered. For this purpose, the spatial position of the object must be determined at regular intervals, which can be done in particular via a mobile radio system at radio cell level or on the basis of coordinates via a navigation satellite system. It is also known to use geofencing areas defined by corresponding boundaries in the form of circles, rectangles or general polygons. However, in all cases it is a prerequisite for geofencing that a corresponding geofencing area or its boundary must be defined in advance in relation to an object to be monitored, and that the actual monitoring of the object in relation to the geofencing area or boundary can only take place thereafter. If the spatial monitoring area for an object is to be changed, for example because it is to be moved to another location where it is to be used, the geofencing area for the object must accordingly be defined anew by making an appropriate configuration of the geofencing system used.

Thus, it would be desirable to further improve the position monitoring of an object, in particular a vehicle or other mobile equipment, and in particular to simplify its implementation and configuration.

SUMMARY

To address these issues identified above, the invention described herein provides several embodiments of a method for automatically monitoring the position of an object. In particular, the invention is applicable—without being limited to this—in the field of position monitoring of construction vehicles or construction equipment, of agricultural vehicles and equipment, or of transport or store management vehicles or equipment, in particular also in the context of fleet management for such objects. In this manner, embodiments of the invention can be used, among other things, to support fleet management processes, in particular also maintenance management, of rental objects of the type mentioned above. It is in particular also applicable in the area of position monitoring of mobile equipment, such as vehicles, which due to their nature are often typically parked or stored, during periods in which they are not used, in areas that are not, or not particularly well, secured against access, such as construction sites, event sites or areas used for agricultural or horticultural purposes, and hence are generally subject to an increased risk of unauthorized removal, in particular through theft, from an intended location of use, an intended parking location or an intended storage location.

In one embodiment, a method for the automatic monitoring of the position of an object is provided, in particular of a vehicle or other mobile equipment, by a position monitoring system. The method is carried out iteratively and each iteration includes: (i) detecting a current position of an object to be monitored; (ii) determining a spatial distance of the detected current position from a position previously specified as a central position; and (iii) checking whether the spatial distance which has been determined exceeds a predetermined distance threshold, and only if this is the case, (iii-1) triggering a predefined functionality of the object and/or of the position monitoring system and (iii-2) specifying the detected current position or a position derived therefrom as a central position for the subsequent iteration.

A "mobile equipment" is intended to be understood to mean a device or tool or a functionally linked group of individual devices or tools which, by their nature and purpose, (i) are mobile as a whole and which for this purpose either are equipped with their own mobility, for example as vehicles, or (ii) which are intended or suitable at least for passive transport by hand, for example by being carried, towed or rolled, or by another transport device, for example a towing or lifting device or a carriage. By way of contrast, immobile installations, which, after their installation, are regularly intended solely for stationary use, are not mobile equipment in the sense of the invention, even if parts thereof are movable or mobile. In particular, mobile equipment may be such devices or groups of devices of the type mentioned above whose spatial area of use is typically limited to a narrowly limited spatial area, e.g. a few kilometers in diameter or less, and which must normally be transported by a separate transport device in order to cover longer distances (e.g. excavators, forklift trucks, cranes, agricultural vehicles, mobile aircraft handling equipment).

The "current position" of an object to be monitored may in particular be understood as the position of a position monitoring device associated with the object, a marking or other characteristic feature on, on top or in the object which can be identified from outside and by whose location detection the current position of the object to be monitored can be identified as a whole. The current position can be indicated in particular on the basis of absolute coordinates (e.g. geographical longitude and latitude) or relative coordinates related to a particular point of reference.

A "derived position" which is derived from the current position is intended to be understood to mean a position which is determined within the framework of the method in accordance with a predetermined derivation rule for which the acquired position serves as an input variable. For example, in a simple case—whilst this should not be understood as a limitation—the derivation rule may include the addition of a respective predetermined distance value to at least one position coordinate, or its multiplication by a predetermined factor.

A "central position" in the sense of the invention is intended to be understood to mean a spatial position in relation to which the spatial distance of the detected current position of the object to be monitored is determined. The central position thus represents the center of a virtual circular area (if seen in two dimensions) or a sphere (if seen in three dimensions) in relation to which the spatial distance of the object to be monitored is to be determined in accordance with the method.

The method thus makes it possible to automatically set up a monitoring area defined by the distance threshold around the current central position and, if the corresponding boundary of the monitoring area defined by the distance threshold is passed, to trigger a predetermined functionality, such as, for example, a notification, and to define a new central position on the basis of the detected position. In contrast to conventional geofencing, in which, if necessary, a spatial adaptation or a new setting of a geofencing area for an object to be monitored must be carried out administratively and individually by configuration (for example if the object is moved to a different location where it is again to be protected against unauthorized changes of location by geofencing), such a time-consuming and costly configuration effort is not required due to the automatic, iterative adaptation of the central position in accordance with the method. Thus, the efficiency of the position monitoring, in particular for tracking the location of the object, for securing the object, in particular against theft, or also for administrative purposes, such as for checking regulatory or maintenance plans, for managing rental fleets of objects or for managing object locations during their maintenance, can be increased.

Several aspects of the method are now described, each of which can be combined at will with each other as well as with the other aspects of the invention described, unless this is expressly excluded or technically impossible.

In one aspect, the detection of the current position of the object to be monitored is carried out either by the object itself or by an additional position detection device, in particular also with the aid of a positioning system supported by a satellite.

In another aspect, the distance threshold is set to zero so that the steps (iii-1) and (iii-2) are performed as part of each iteration.

The object to be monitored may in particular be, but is not limited to, a vehicle or other mobile equipment, such as for example an implement or a tool, or construction or works-related material. In particular, the object may be a construction vehicle or construction equipment, such as an excavator, a roller, a crane, a compressor, a paving machine, etc., or an agricultural vehicle, such as for example an agricultural tractor unit (tractor) or trailer and related tools, or a combine harvester. The object can in particular also be a transport or store management vehicle, for example a forklift truck or a transport or mobile store management robot, or a ground vehicle for handling or maintenance, in particular for cleaning, de-icing, refueling, loading and unloading or maneuvering of aircraft. The object can also be an aircraft, such as for example a drone or balloon, or a watercraft, such as for example a floating sensor platform, a rental boat, or water sports equipment.

In a further aspect, the method further includes, before a first iteration of the set of steps of the method: detecting a current position of the object to be monitored and defining an initial central position in order to initialize the first iteration of the method on the basis of this detected current position. In this way, an individual configuration of an initial monitoring area by a user or administrator of a corresponding position monitoring system carrying out the method, and thus the associated effort, can be completely eliminated. Instead, an initial central position, as well as all further central positions defined in the respective subsequent iterations, are defined according to these embodiments on the basis of the detected position itself of the object to be monitored.

A "first" iteration in the sense of the invention is intended to be understood to mean such an iteration of the method which is not itself based on the result of a preceding iteration, i.e. an iteration in which the determination of the spatial distance of the current position detected thereby is not carried out relative to a central position which has been determined in a preceding iteration and which has been taken over from this, but is carried out relative to an initial central position which is determined independently therefrom. However, the initial central position can be determined in particular in the same way and by the same means as the respective central positions during the subsequent iterations of the method.

In yet another aspect, the triggering of a respective further iteration takes place if, in particular only if, the occurrence of one or more conditions from the group of the following conditions or from a predetermined non-empty subset of this is detected: (i) activation or deactivation of a power supply or of an operational mode of the object to be monitored; (ii) expiry of a predetermined period of time since a defined reference point in time, in particular since a defined reference point in time of a preceding iteration, such as for example its time of completion; (iii) a predetermined point in time, which can in particular be defined as an absolute point in time or relative to another, measurable point in time, such as for example a particular time of day or a point in time which is determined by a period of time since activation or deactivation of an operational mode of the object to be monitored; (iv) occurrence of a predetermined state of motion or a predetermined change in the state of motion of the object, such as for example a start of a movement or the end of a movement, of a velocity or an acceleration of the object; (v) occurrence of a handover to another mobile radio cell relating to a mobile radio connection with a mobile radio network existing in relation to the object or its associated monitoring device; (vi) upon detection of a current position, a change in location of the object or its associated monitoring device occurring in relation to a previously detected position is detected.

In this way, it is possible to select and specify the granularity of the iterations, i.e. their chronological sequence, as well as their possible triggers, in a wide variety of ways according to the respective requirements of an intended application. The condition (i) is useful in particular so as to ensure that the monitoring area is redefined each time there has previously been a possibility that the object may have been relocated in a deactivated state, such as when the object has been moved to another location in a deactivated state where a new monitoring area is to be set up. The conditions (ii) and (iii), on the other hand, are defined in a time-dependent manner and are therefore suitable in particular so as to define regular monitoring which is independent of the actual use or operation of the object, which, assuming a corresponding power supply, for example a power supply which is backed up by a battery, can be used to monitor the object even when the object to be monitored is in a deactivated state. Similarly, the condition (iv) can be used not only during an active operating mode of the object to be monitored, but also, like the conditions (ii) and (iii), when the object itself is inactive and, for example, is moved passively, as might be the case in the case of theft.

In one aspect, the detection of the current position of the object to be monitored takes place on the basis of a plurality of positions of the object detected within the framework of the current iteration, in particular on the basis of an averaging of these positions. Thus, for example, an average center of displacement can be determined for the object and used on the one hand in order to determine the spatial distance in the current iteration, as well as in order to determine a new central position for the subsequent iteration. This can be helpful in particular if, for example, on a larger construction site whose dimensions exceed the distance threshold, the monitoring area for the object within the construction site is to be limited to a partial area of the construction site area, which in addition corresponds to the actual, at least predominant spatial area of where the object is to be used. The object could, for example, be an excavator which, at least substantially, is to be used and remain in a small section of a large motorway construction site without however necessarily only being used in a fixed location.

In a further aspect, the predefined functionality comprises one or more of the following: (i) issuing or transmitting a notification and/or a current position to a remote party; (ii) blocking or removing at least one functionality of the object, in particular its ability to operate or to be used, as a whole. In particular, the notification may also be transmitted at another location remote from the location of the object, for example via a communication link to a monitoring center, in particular a central data processing platform, which acts as the opposite side, i.e. as the opposite side of the transmission of the notification. The blocking of the functionality of the object can take place, in particular if the object is a vehicle, a machine or other equipment which has at least one blockable functionality, by a transfer of the object into a mode which is secure and which is protected against unauthorized unlocking, in which only a predetermined partial operation with a limited scope of functionality or even no operation at all is possible. In other cases it may even be appropriate to eliminate the functionality permanently, such as for example by targeted destruction of object components which are required for the functionality to be performed, for instance in order to counter any dangers that might otherwise emanate from the object.

In the case that a notification is issued or transmitted in the current iteration: (i) a query is initiated at a man-machine interface by which a user is offered a selection option to set, by user input, the central position of the current iteration or any other specified position as the central position for the subsequent iteration instead of the detected current position; and (ii) in the case of a corresponding user input at the man-machine interface being made, the central position for the subsequent iteration is set in accordance with the user input made. In particular, this makes it possible, in cases in which a movement of the central position is to be avoided at least for the next iteration, instead to maintain the central position used until then. This is advantageous in particular if the desired location of use of the object is not intended to change. On the other hand, however, it is also possible to specifically enter a different position, which can be useful, for example, if the notification is triggered by an authorized transport of the object beyond the monitoring area applicable until then, and the object is moved to a new deployment location, the position of which can then be chosen as the new central position and defined via the man-machine interface, without the object first having to go through at least one new iteration at the new deployment location.

In another aspect, within the framework of the iterative performance of the method, the outputting of a further notification is suppressed in the event that, in several of the iterations, it is determined during checking that the spatial distance that has been determined exceeds a predetermined distance threshold, if, within the framework of one or more preceding iterations, a defined number N, with $N \geq 1$ (preferably N=1), of notifications have already been output, each of which having indicated that the distance threshold has been exceeded. This means that only n notifications are issued, which is advantageous in particular if one or more additional notifications would otherwise occur in connection with an authorized or unauthorized movement or transport of the object over a longer period of time or a greater distance, which one or more additional notifications would be redundant or would in any case have a disruptive effect in view of the preceding notification or would reduce the efficiency of the method, particularly with regard to available communication capacity and possibly existing limited power supply capacities, in particular battery-supported power supply capacities.

In yet another aspect, the predetermined distance threshold is set to a new value during the iterative performance of the method. This new value is then used within the framework of the iterative performance of the method for future checks as to whether the spatial distance that has been determined exceeds the predetermined distance threshold. In particular, this can be done in such a way that earlier results from checks from previous interactions are not affected by this, i.e. in particular are not determined anew. In this way, it is possible to dynamically adjust the distance threshold and hence the monitoring area, for example as a function of a time, even while the method is being carried out. For example, the monitoring area could be defined much narrower during nighttime, when the object is not intended to be in use, than during daytime, when the object is typically in use.

In one aspect, this new value may in particular be zero, in order to force the predefined functionality of the object and/or of the position monitoring system to be triggered for the subsequent iterations and the detected current position or a position derived therefrom to be set as the central position for the subsequent iteration. Alternatively, in some other embodiments, the new value for the distance threshold may also correspond in particular to the previously determined spatial distance of the detected current position from a position previously defined as the central position.

In another aspect, the setting of the predetermined distance threshold comprises automatically selecting a predefined distance threshold value from a set of two or more predefined distance threshold values in dependence on at least one selection parameter. Thus, the dynamic setting of the distance threshold and thus of the monitoring area can also be carried out in an automated manner and on the basis of a selection of previously defined distance threshold values, in particular distance threshold values which are adapted as regards the particular situation. An individual definition, in particular to be carried out by a user, is therefore no longer necessary. In addition, the distance threshold values can be optimized, tested and defined in advance so that the dynamic setting of the distance threshold is reduced to a mere selection of one of several already predetermined distance threshold values.

In a further aspect, the predefined distance threshold values of the set can be set on the basis of a movement history of the object to be monitored itself and/or on the basis of one or more other objects associated with the object to be monitored, in particular on the basis of an identical or related object type, operational environment or spatial proximity. Thus, empirical values and/or predictable or known correlations obtained in the past, especially in an automated manner, can be used to define the various predefined distance threshold values which are optimized, for example, with regard to efficiency, application, error avoidance or sensitivity of monitoring.

In yet another aspect, the at least one selection parameter identifies one or more of the following pieces of information related to the object to be monitored: (i) kind or type of the object; (ii) a detected position, in particular a previously determined central position, of the object; (iii) a particular period of time or a particular point in time; (iv) a detected property or a detected condition of the spatial environment of the object; (v) a current state or mode of operation of the object; and (vi) a current context of use of the object. Accordingly, using for example the appropriately selected selection parameter, the monitoring area may be selected to be larger for a vehicle than for a non-self propelling device, in accordance with option (i); a location-dependent definition of the new monitoring area may be set in accordance with option (ii); may be set differently for daytime and nighttime or weekdays and official holidays, in accordance with option (iii); or may be adapted to an ambient brightness or current weather conditions, in accordance with option (iv); may be set in dependence on, for example, a filling or loading condition or a maintenance condition of the object, in accordance with option (v); or set in dependence on a current task, or the activation or deactivation of a transport mode or travel mode of the object, in accordance with option (vi).

In accordance with another embodiment, a system for automatically monitoring the position of an object is provided, in particular of a vehicle or other mobile equipment, where the system is configured to carry out the method described herein in detail. The system may be implemented in particular in the form of a single constructional unit or assembly, or as a spatially distributed system of several components which are at least partially separated from one another.

In one aspect, the system includes a data processing platform as well as one or more monitoring devices which are constructed to be separate from the data processing platform, each of which are arranged to detect the current position of a respective object to be monitored. The system is configured to carry out the method embodiments of the method described herein, through the data processing platform and a respective one of the monitoring devices with division of tasks between the two. In particular, the construction or configuration of the system may be selected such that at least one of the monitoring devices is configured within the framework of the method to (i) detect a current position of an object to be monitored, while the data processing platform is configured to (ii) determine a spatial distance of the detected current position from a position previously specified as a central position, (iii) check whether the spatial distance which has been determined exceeds a predetermined distance threshold, and, if this is the case, (iii-1) trigger a predefined functionality of the object and/or of the position monitoring system, and (iii-2) determine the detected current position as a central position for the subsequent iteration.

The data processing platform may comprise one or more processors, and may be implemented in particular as a central data processing platform, for example by one or more servers, which can communicate via corresponding communication links, for example via the Internet, with the monitoring devices locally present in the respective monitoring area. In particular, the monitoring devices can themselves be part of the respective object to be monitored, or can instead be connected to it. Accordingly, the monitoring devices can for example be position determination modules for the cooperation with a satellite-based positioning system, or mobile radio-based positioning devices or positioning devices based on other positioning principles. In this way, the system can on the one hand be implemented and administered centrally in an efficient manner and can on the other hand be used for position monitoring, in particular simultaneous position monitoring, of a large number of objects.

In another aspect, the system is arranged to provide a man-machine interface, for example in the form of an Internet portal, that is configured: (i) to provide a facility for configuring, by at least one user input, a position monitoring, to be performed by the system in accordance with the method, of an object to be monitored; and/or (ii) to issue a notification initiated by the system in the course of the performance of the method.

In this way, in particular a convenient and, in the case of a central implementation of the data processing platform, a central, facility for administration, in particular configuration, of the system and of the position monitoring to be performed by it for one or more objects to be monitored is made possible. In particular, the defining of initial or individual subsequent central positions or the individual setting of distance thresholds or of selection parameters and predefined sets of distance threshold values is thus made possible in an efficient and convenient way, also from a distance.

In this way, notifications that are triggered, for example, by passing the boundary of a monitoring area as determined by a corresponding distance threshold, can also be issued, in particular centrally at the man-machine interface, so that in particular a simultaneous resource-saving central monitoring of several objects is supported, as well as an agreed or coordinated reaction to several notifications that have occurred. In addition, the notifications can thus also be issued at a location other than at the object itself or in its spatial surroundings, which can be used in particular with regard to monitoring for theft protection in order to issue warning notices, without this being easily recognizable at the stolen object itself or its surroundings.

In yet another embodiment, mobile equipment is provided, in particular a vehicle, comprising a system in accordance with the embodiments of the invention described above.

In a further embodiment, a computer program is configured to cause a system to carry out the method of monitoring an object, preferably according to one or more of the associated embodiments described herein.

The computer program may in particular be stored on a non-volatile data storage medium. This may for example be a data storage medium in the form of an optical data storage medium or a flash memory module. This can be advantageous if the computer program as such is to be traded independently from a processor platform, such as the system in accordance with the invention, on which the one or more programs are to be executed. In another implementation, the computer program may exist as a file on a data processing unit, in particular on a server, and may be downloadable via a data connection, such as the Internet or a dedicated data connection, such as for example a proprietary network or a local network. In addition, the computer program may comprise a plurality of cooperating individual program modules.

The features and advantages explained in relation to one embodiment will be understood to apply equally to the other embodiments described herein.

BRIEF DESCRIPTION OF THE DRAWINGS

Various additional features and advantages of the invention will become more apparent to those of ordinary skill in the art upon review of the following detailed description of one or more illustrative embodiments taken in conjunction with the accompanying drawings. The accompanying drawings, which are incorporated in and constitute a part of this specification, illustrates one or more embodiments of the invention and, together with the general description given above and the detailed description given below, explains the one or more embodiments of the invention.

DETAILED DESCRIPTION

Figure 1:
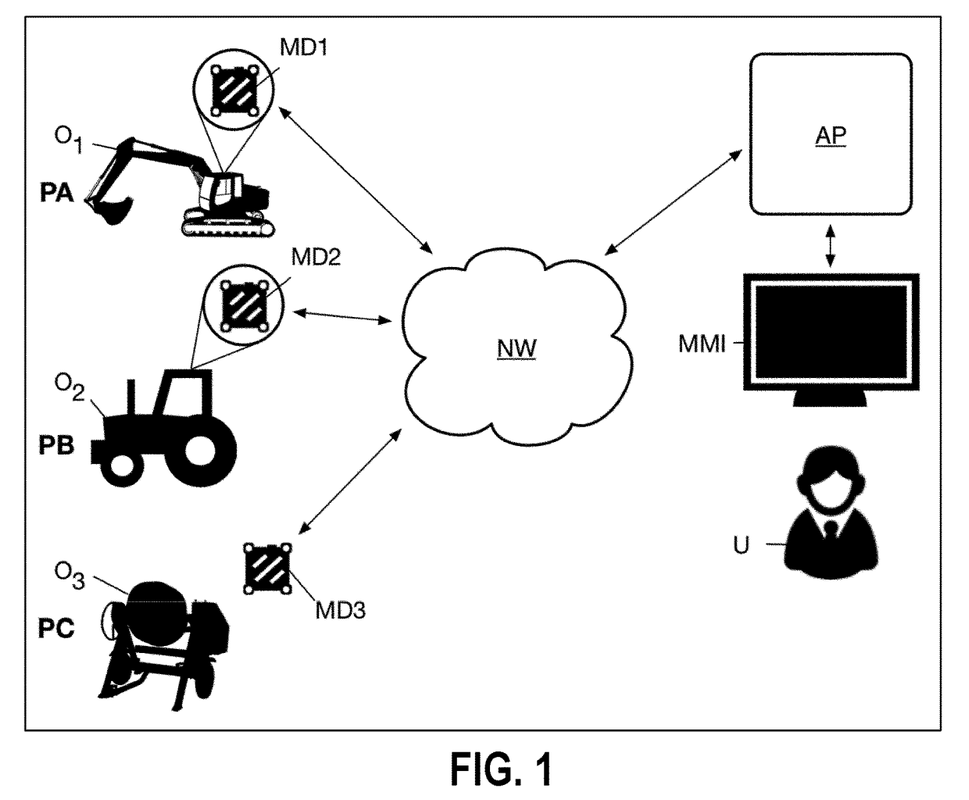
FIG. 1 shows a schematic overview of a system according to one embodiment of the invention in connection with an example set of objects whose positions are to be monitored.

First, reference is made to FIG. 1. This shows an example system which comprises a central data processing platform AP, which is arranged to output information to a user U and to receive user input from this user at a man-machine interface MIMI, which in particular can be constructed by an Internet portal. The data processing platform AP can communicate with, and exchange data with, a plurality of monitoring devices via a network NW, which can in particular be the Internet—here, for example, and without this to be seen as a restriction, with three monitoring devices $MD_1$ to $MD_3$. The monitoring devices $MD_1$ and $MD_2$ are each integrated as a component in an associated object $O_1$ and $O_2$ to be monitored or, in the case of $MD_3$, connected to an object $O_3$ to be monitored in such a way that a change of the location of the corresponding object $O_3$ also entails a corresponding change of the location of the monitoring device $MD_3$.

The system in accordance with the invention and contained in FIG. 1 thus comprises on the one hand the data processing platform AP as well as the monitoring devices $MD_1$ to $MD_3$, and optionally also the man-machine interface MMI. However, in other embodiments, which are not illustrated here, each individual one of the monitoring devices $MD_1$ to $MD_3$ can also constitute a system in accordance with the invention. Each of these systems, i.e. in particular also the system shown in FIG. 1, is arranged to carry out the method in accordance with the invention, in particular it can be arranged to carry out the example embodiment of the method, which will now be explained in connection with FIGS. 2A and 2B.

Figure 2A:
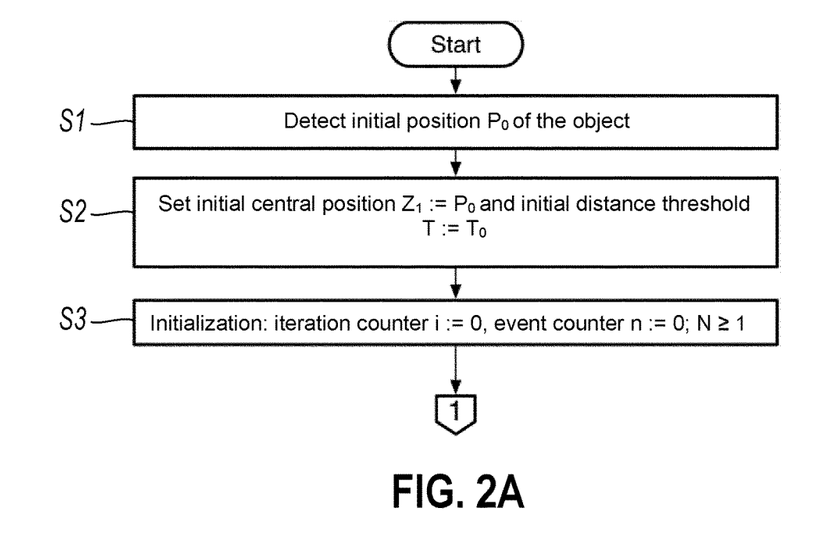
FIG. 2A is a schematic flowchart showing one embodiment of a method in accordance with the invention.

FIG. 2A shows an initialization phase of the method, which can take place in particular when the system for monitoring a certain object, for example the object $O_1$ from FIG. 1, is used for the first time, or after resetting the system. The method is explained by way of example with reference to FIG. 1.

In the initialization phase, an initial position $P_0$ of the respective object to be monitored—in the following this is, by way of example, the object $O_1$ from FIG. 1—is detected in a step S1. For this purpose, the corresponding monitoring device $MD_1$ comprises a position determination device, which can in particular be a satellite navigation device that interacts with one or more corresponding global satellite navigation systems—such as GPS, Glonass, Galileo or Beidou—for position determination. Then, in a step S2, an initial central position $Z_1$ is initialized with the detected value $P_0$ and, further, a distance threshold value T is set to an initial distance threshold value $T_0$ which has been acquired from a user U via the user interface MMI. Further, in the initialization phase in a step S3, an iteration counter i as well as an event counter n are each set to a start value, in this case "0", and an event threshold value $N \geq 1$ is set, which defines how often, in the event of a multiple occurrence of a monitoring event, a predetermined functionality of the system envisaged for such a case, such as the outputting of a notification, is to be triggered.

Figure 2B:
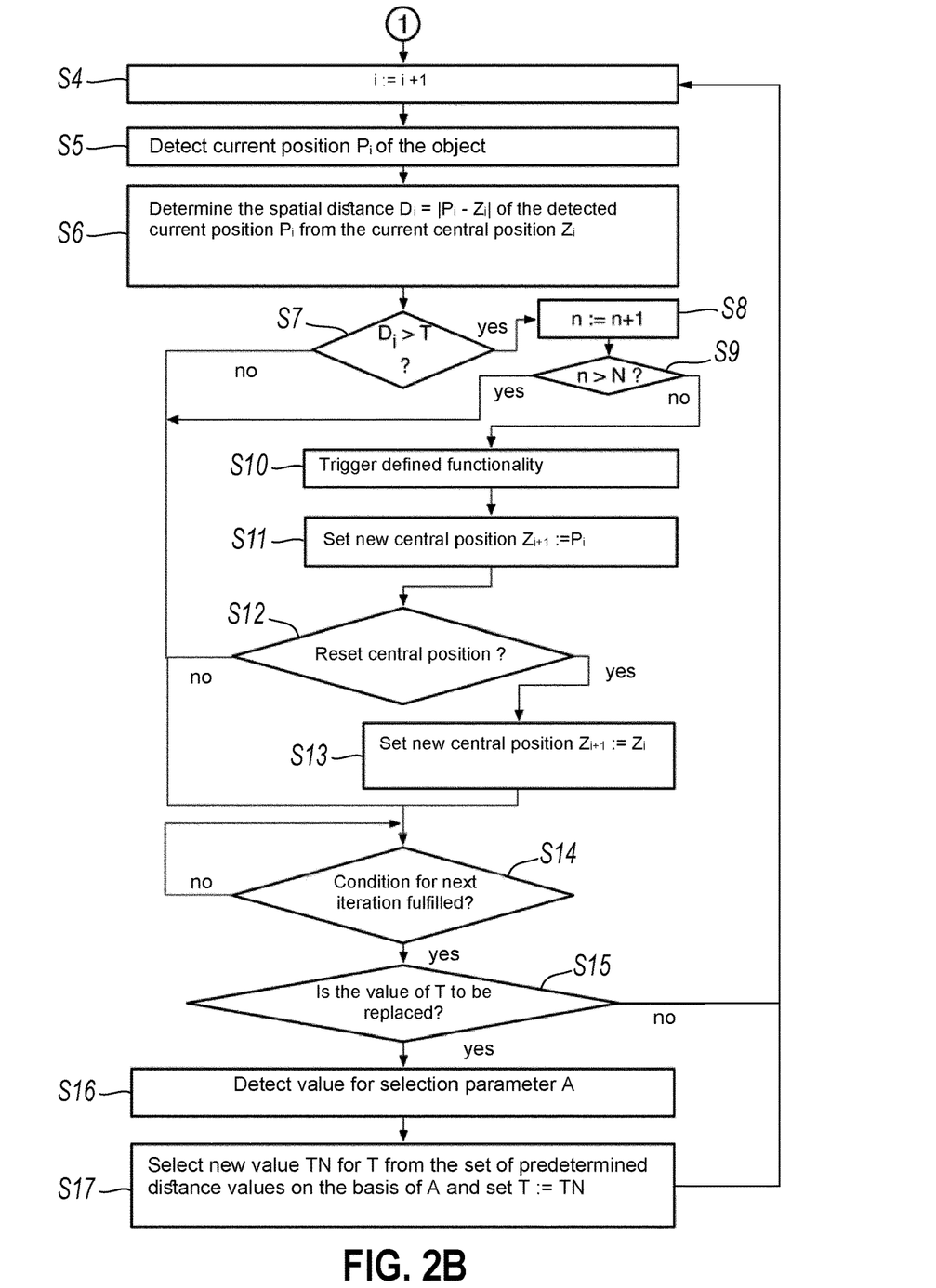
FIG. 2B is a schematic flowchart showing further steps of the method of FIG. 2A.

As illustrated by the corresponding diagram connector "1", an iteration phase, which is illustrated in FIG. 2B, follows on from the initialization phase of the method shown in FIG. 2A. The steps S4 to S16 or S17—depending on the method—of the iteration phase together represent an iteration of the method. In the step S4, the iteration counter i is first incremented in order to correctly indicate the current iteration, so that in the present example i=1 for the first iteration, i=2 for the second iteration, and so on. Of course, any other counter is also possible, or implementations which do not require a corresponding counter. Then, in the step S5, a current position $P_1$ of the object $O_1$ is detected by the monitoring device $MD_1$. Thus, the conditions for calculating, in a further step S6, the value (i.e. the amount) of the spatial distance $D_1$ between the position $P_1$ and the current central position $Z_1$ are given.

By comparing the calculated distance $D_1$ with the current distance threshold T, it is then determined in the step S7 whether the distance exceeds the distance threshold T. If this is the case (S7—yes), this means that there is a monitoring event which has been triggered by a corresponding—possibly unauthorized—change in location of the object $O_1$ to be monitored, out of the monitoring area F defined by the distance threshold (see FIG. 3). In this case (S7—yes), the event counter n is incremented in the step S8 and is compared with the event threshold value N in the step S9. If the result of this comparison indicates that the event threshold value N has been exceeded (S9—yes), or if, from the outset, there is no monitoring event at all (S7—no) according to step S7, the method branches off to a step S14 described below. Otherwise (S9—no) a step S10 follows, in which a predetermined functionality is triggered by the system in order to indicate the occurrence of the monitoring event. This functionality can in particular consist of issuing a notification to one or more predetermined receiving entities, which can in particular take place at the man-machine interface MMI. As a further such functionality, in particular the triggering of one or more signals is also conceivable which put the corresponding object $O_1$ into a different mode via the monitoring device $MD_1$, in particular into a mode or state in which its functionality is completely or partially blocked against unauthorized use. For example, a power supply to the object $O_1$ can also be interrupted in this way, in order to prevent unauthorized use or at least in order to make it more difficult.

Then, in the case (S9—no), the central position $Z_{i+1}$ of the next iteration is additionally set to the current object position $P_i$ of the current iteration i in a step S11 in order to prepare the next iteration. Accordingly, in the method illustrated here, the predetermined functionality is triggered (S10) and, subject to the steps S12 and S13 described below, a new central position for the respective next iteration is determined (S11) only if the tests in the steps S7 and/or S9 show that the current distance threshold T has been exceeded and additionally the event counter n also exceeds the value N. However, the distance threshold can optionally also be set to a very small value in relation to the typical radius of action of the object or even to T=0 (if necessary additionally with a length unit), so that the steps S10 and S11 are then run through regularly in most or in all iterations, and accordingly also in particular that a new central position is set. In the opposite case, the distance threshold T can be set to a larger, in particular at least twice as large value in relation to the typical radius of action of the object, so that the steps S10 and S11 are only run through in the case of large changes in location.

Optionally, further steps S12 and S13 can be provided (as shown), which enable the user to reset the central position $Z_{i+1}$ for the next iteration i+1 if desired, in particular to the value $Z_i$ of the central position of the current iteration i, e.g. as a reaction to a corresponding query at the man-machine interface MMI. This can be useful in particular if an unchanged monitoring area is advantageous for the next iteration as well. An example scenario for this would be a scenario where a construction device (object) is parked at the end of the day at the edge of the monitoring area of the current iteration i, but is to be used in the same monitoring area the next day, so that a change of the monitoring area is not expedient.

This is followed by a further step S14, in which a check is carried out as to whether a single condition or a predefined combination of several predefined conditions is fulfilled for the next iteration. Such a condition can consist in particular in the fact that by the corresponding monitoring device $MD_1$ an activation or a deactivation of a power supply or of an operative mode of the object $O_1$ to be monitored, the expiry of a certain time interval since a defined reference point, for example since the beginning of the last iteration i−1, an absolute, predetermined point in time, in particular predetermined by a corresponding time of day, or the occurrence of a predetermined state of movement or a predetermined change in the state of movement of the object $O_1$ (speed, acceleration and so on) has been detected and signaled to the data processing platform AP.

If the condition is not (yet) fulfilled (S14—no), the step S14 is repeated in a loop-like manner, if applicable each time after a predetermined time interval, in particular optionally also variable, configurable time interval. Otherwise (S14—yes), as shown in the example method of FIG. 2B, an adjustment of the distance threshold T can optionally also be carried out. It is expedient that this be carried out in dependence upon a check in the step S15 in order to determine whether such an adjustment is desired by the user U or whether it is prescribed based on a rule. In accordance with this, in the step S15 a corresponding user request can for example be triggered and a corresponding user input can be evaluated at the man-machine interface MMI. It is also possible to perform the test in the step S15 in dependence upon a parameter known to the system, for example a time of day or information recorded by the corresponding monitoring unit $MD_1$ regarding the object $O_1$, for example regarding its current state or operating mode.

If the distance threshold T is to be replaced by a new value according to the test in the step S15 (S15—yes), this new value TN is to be determined. In the example method of FIG. 2B this is done by a selection of the new value TN from a set of already predetermined possible values. For this purpose, the value for a selection parameter A is detected in the step S16 (e.g. by $MD_1$), on the basis of which the selection of TN from the set is made in the step S17, and TN is defined as the new distance threshold T for at least the next iteration i+1. The selection parameter A can in particular indicate one or more of the following information concerning the object $O_1$ to be monitored: kind or type of the object $O_1$, a detected position of the object $O_1$, a particular period of time or a particular point in time, a detected property or a detected state of the spatial environment of the object $O_1$, a current state or operating mode of the object $O_1$, or a current usage context of the object $O_1$, as already described above in detail. Otherwise (S15—no), and optionally also after completion of step S17, at the start of a new iteration, the method branches back to the step S4. Of course, as a rule, the possibility of aborting the method will also be provided along at least one point in the method (not shown here). This can take place in particular by an appropriate dedicated user query, or however also by specifying, in the context of one of the user queries or other checks already mentioned, a particular input and/or a particular check result as an abort criterion.

Figure 3:
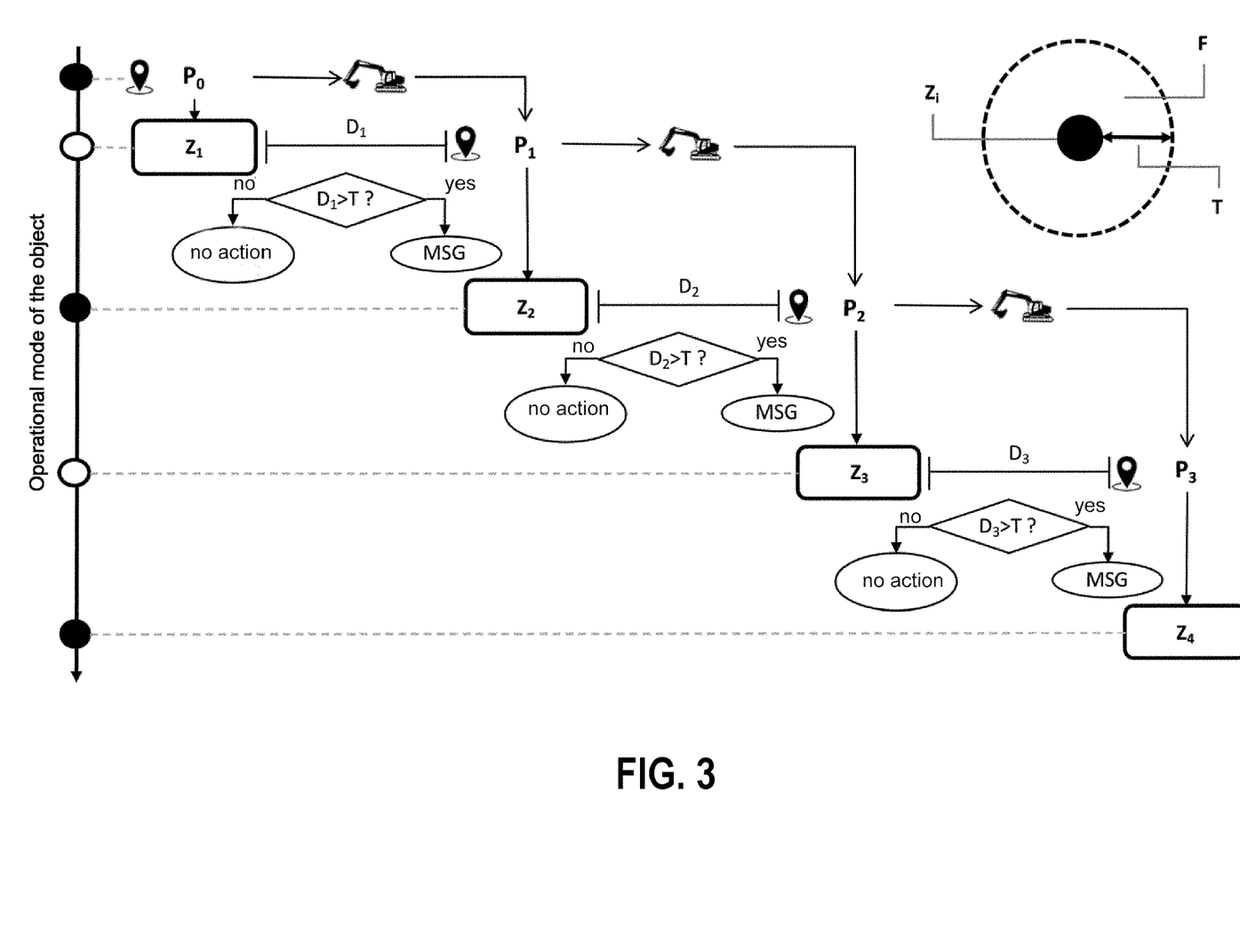
FIG. 3 is a schematic diagram that further illustrates aspects of the method in accordance with embodiments of the invention.

In the upper right part of FIG. 3 the concept of a monitoring area F, which is defined around a central position $Z_i$ by a distance threshold T, is again shown schematically. If the object to be monitored leaves this monitoring area F, i.e. if it passes the circular or spherical boundary line or boundary surface of the monitoring area F, this represents a monitoring event which is detected with the aid of the method and a predetermined reaction is then triggered.

The other part of FIG. 3 again illustrates the iterative character of the method in accordance with the invention, but in a different way by an example embodiment. Again, a position $P_0$ initially detected of the object to be monitored is defined as central position $Z_1$ for a first iteration i=1. This initialization takes place, for example, when—as schematically shown on the left side of FIG. 3—a change in the operating mode of the object takes place, for example from a switched-off state (symbolized by an empty circle) to a switched-on state (symbolized by a solid circle). A further change in the operating mode (back to the switched-off state) triggers the first iteration i=1, in which the distance $D_1$ between a detected current position $P_1$ and $Z_1$ is determined and, as a function of a comparison of $D_1$ with the distance threshold T, a notification MSG to the user U of the system is triggered (if a monitoring event has been detected by the comparison), or otherwise (no monitoring event detected) no such notification MSG takes place. The central position $Z_2$ for the next iteration is then defined by the current position $P_1$ and thus preparations are made for the next iteration i=2. The method continues in a corresponding manner, wherein a respective next iteration is again triggered by a further change in the operating mode. Hence FIG. 3 illustrates the displacement of the central position from originally $Z_1$ to $Z_4$ and thus an associated, corresponding displacement of the monitoring area F for the object $O_1$ to be monitored. This adjustment or displacement is carried out automatically, without there being a need for the user to reconfigure the monitoring area F accordingly.

Figure 4:
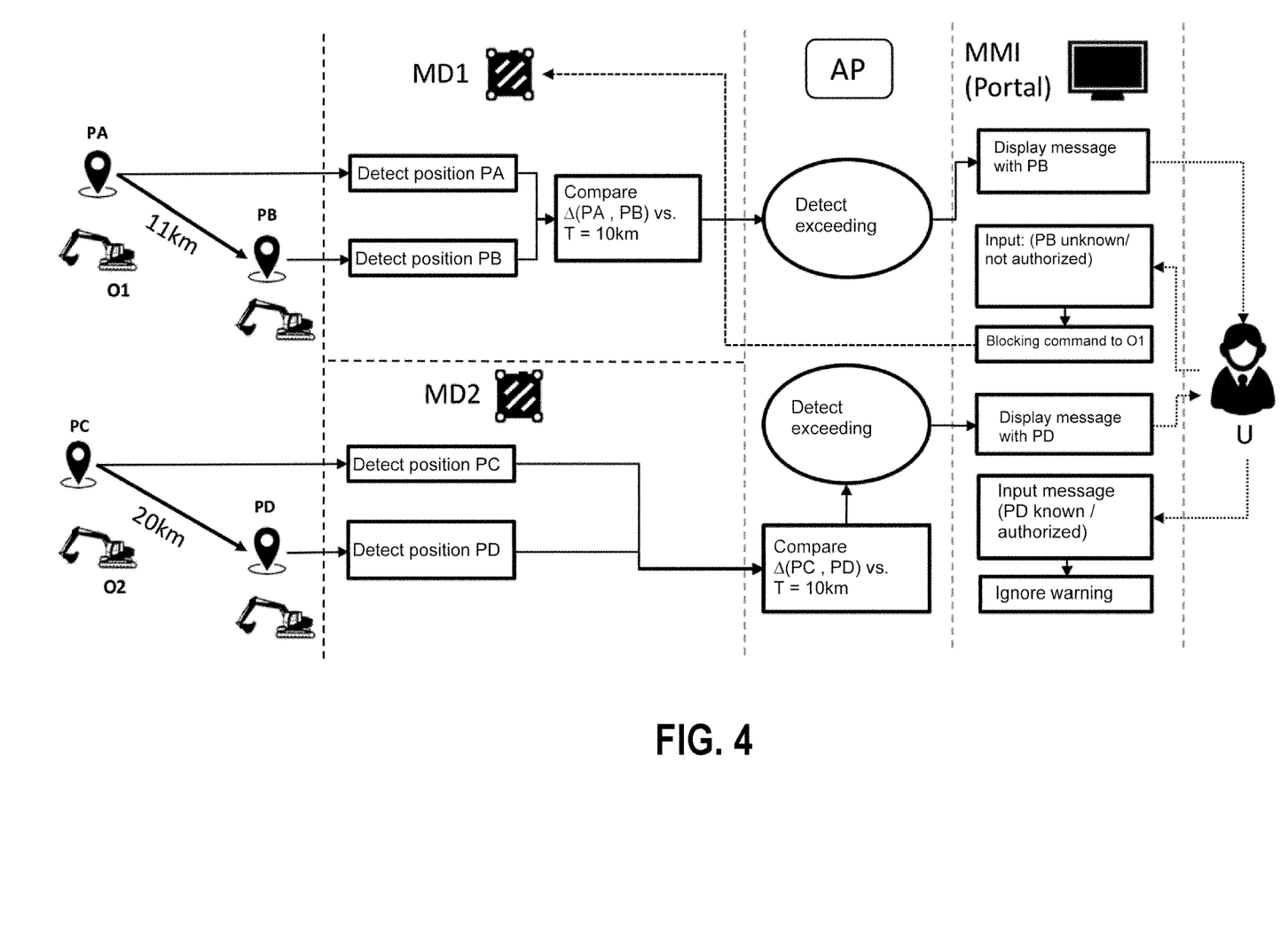
FIG. 4 is a schematic diagram outlining an example application scenario in which, depending on the object, different divisions of tasks between the individual object-related monitoring devices and a central management platform are illustrated.

FIG. 4 illustrates an example application scenario in which, depending on the object, different divisions of tasks between the individual monitoring devices $MD_1$ and $MD_2$ respectively related to the objects, and the central management platform AP are represented. Two different objects to be monitored, $O_1$ and $O_2$, are shown here by way of example. The object $O_1$ is first located at a position PA and then undergoes a change of location by a spatial distance of 11 km to a new position PB. In a similar way the object $O_2$ undergoes a change of location from an original position PC to a new position PD, which is 20 km away from PC. The distance threshold T is assumed to be 10 km for both objects by way of example. For both objects, the respective monitoring devices $MD_1$ or $MD_2$ serve in particular to detect the respective positions PA, PB and PC, PD. In the case of $MD_1$, the monitoring device is additionally set up to carry out the comparison of the two positions as part of a respective iteration of the method, and to communicate the result of the comparison to the data processing platform AP. The data processing platform AP is then in a position to detect that the boundary of the monitoring area F has been passed (since 11 km>T) and thus to detect a monitoring event and thus to cause the display of a corresponding notification with an indication of PB at an associated man-machine interface MMI, which again can be constructed in particular as an Internet portal, in order to inform a user U about the occurrence of the monitoring event with regard to the object $O_1$.

In contrast, the monitoring unit $MD_2$ itself is not able, or at least in the illustrated case is not used, to carry out the corresponding comparison of the positions PC and PD. Rather, this is only done at the data processing platform AP on the basis of the positions PC and PD transmitted by $MD_2$. There is therefore a different distribution of tasks between the monitoring unit $MD_2$ and the data management platform AP than in the case of the pairing of $MD_1$ and AP.

FIG. 4 also illustrates how, in dependence upon the respective application scenario, a different reaction to the monitoring event occurring in the two cases can occur. In the case of the object $O_1$, a corresponding query at the man-machine interface MMI (or alternatively in a database provided with corresponding information) provides an evaluation, according to which the new position PB of the object $O_1$ is unknown to the user or operator U of the system or in any case the change of location of $O_1$ to PB has not been authorized. As a consequence, a further functionality is triggered, which in this case comprises the transmission of a blocking command regarding the object $O_1$ to the associated monitoring device $MD_1$, in order thus to block critical functions of the object $O_1$ or even its entire operation.

In the case of the object $O_2$, on the other hand, based on the input requested from the user U or corresponding data from the database, there is information that the position PD is firstly known and secondly also authorized. For example, it could relate to a depot to which the object $O_2$ has deliberately been moved in a manner which had been authorized by U. The position PD could also be e.g. a new desired deployment location for $O_2$, or a location to which it has been lent. Thus, in this case the notification can be ignored without there being a need to trigger further activities to ensure the protection of the object $O_2$.

While at least one example embodiment has been described above, it should be noted that there are a large number of variations to this. It is also to be noted that the embodiments described by way of example only represent non-limiting examples, and it is not intended to thereby limit the scope, the applicability or the configuration of the devices and methods described here. Rather, the preceding description will provide the skilled person with instructions for the implementation of at least one example embodiment, it being understood that various changes can be made in the functionality and arrangement of the elements described in an example embodiment, without deviating from the subject matter respectively defined in the appended claims, as well as its legal equivalents.

The embodiments described above are only descriptions of preferred embodiments of the present invention, and are not intended to limit the scope of the present invention. Various variations and modifications can be made to the technical solution of the present invention by those of ordinary skills in the art, without departing from the design and spirit of the present invention. The variations and modifications should all fall within the claimed scope defined by the claims of the present invention.

REFERENCE CHARACTERS $O_1$, $O_2$, $O_3$ objects to be monitored
PA, PB, PC different positions of the objects
$MD_1$, $MD_2$, $MD_3$ monitoring devices
AP data processing platform
NW network, in particular Cloud
MMI man-machine interface
U user, in particular system administrator
i iteration counter
$P_0$ initial position of an object
$P_i$ current detected position of objects for the i-th iteration
$Z_i$ central position of the i-th iteration
$D_i$ spatial distance determined in the i-th iteration
$T_0$ initial distance threshold
T distance threshold in current iteration
TN new selected distance threshold
F monitoring area
n event counter
N threshold value for event counter
A selection parameter
MSG notification

What is claimed is:

1. A method for automatic monitoring of a position of an object by a position monitoring system, comprising the following set of steps, which are carried out iteratively:
   detecting a current position of the object;
   determining a spatial distance of the current position from a position previously specified as a central position;
   checking whether the spatial distance exceeds a predetermined distance threshold; and
   triggering a predefined functionality of at least one of the object and the position monitoring system and specifying the detected current position or a position derived therefrom as a central position for a subsequent iteration of the set of steps of the method, when the spatial distance exceeds the predetermined distance threshold,
   wherein the predefined functionality comprises blocking or removing at least one functionality of the object,
   wherein the predefined functionality further comprises issuing or transmitting at least one of a notification and a current position to a remote party,
   wherein within subsequent iterations of the steps, the method further comprises:
suppressing outputting of a further notification when, in several prior iterations, it is determined during checking that the spatial distance that has been determined exceeds a predetermined distance threshold, and when, within one or more preceding iterations, a defined number N, with N>1, of notifications have already been output in the prior iterations, each of which having indicated that the distance threshold has been exceeded, and wherein a triggering of a respective further iteration takes place when any condition from the following group or a predetermined subset thereof is detected:
activation or deactivation of a power supply or of an operational mode of the object;
expiry of a predetermined period of time since a defined reference point in time;
a predetermined point in time; and
occurrence of a handover to another mobile radio cell relating to a mobile radio connection with a mobile radio network existing in relation to the object or its associated monitoring device.

2. The method of claim 1, further comprising, before a first iteration of the set of steps:
detecting a current position of the object; and
defining an initial central position to initialize the first iteration of the method on the basis of the current position.

3. The method of claim 1, wherein the detection of the current position of the object takes place on the basis of a plurality of positions of the object detected within a framework of a current iteration.

4. The method of claim 3, wherein the detection of the current position of the object takes place on the basis of an averaging of the plurality of positions of the object detected within the framework of the current iteration.

5. The method of claim 1, wherein when a notification is issued or transmitted in the current iteration:
a query is initiated at a man-machine interface by which a user is offered a selection option to set, by user input, the central position of a current iteration or any other specified position as the central position for a subsequent iteration instead of the detected current position; and
in the case of a corresponding user input at the man-machine interface being made, the central position for the subsequent iteration is set in accordance with the user input made.

6. The method of claim 1, wherein the predetermined distance threshold is set to a new value during an iterative performance of the method and the new value is used within a framework of the iterative performance of the method for future checks as to whether the spatial distance that has been determined exceeds the predetermined distance threshold.

7. The method of claim 1, wherein setting the predetermined distance threshold comprises automatically selecting a predefined distance threshold value from a set of two or more predefined distance threshold values in dependence on at least one selection parameter.

8. The method of claim 7, wherein the predefined distance threshold values of the set are determined on the basis of a movement history of at least one of the object and one or more other objects associated with the object.

9. The method of claim 8, wherein the at least one selection parameter identifies one or more of the following pieces of information related to the object:
kind or type of the object;
a detected position of the object;
a particular period of time or a particular point in time;
a detected property or a detected condition of a spatial environment of the object;
a current state or mode of operation of the object;
a current context of use of the object.

10. A system for automatically monitoring the position of an object, comprising:
a data processing platform, and
one or more monitoring devices which are constructed to be separate from the data processing platform, each of which are arranged to detect a current position of a respective object to be monitored;
wherein the system is configured to carry out a method through the data processing platform and a respective one of the monitoring devices with division of tasks between the data processing platform and the monitoring devices, the method comprising the following set of steps, which are carried out iteratively:
detecting a current position of the object;
determining a spatial distance of the current position from a position previously specified as a central position;
checking whether the spatial distance exceeds a predetermined distance threshold; and
triggering a predefined functionality of at least one of the object and the position monitoring system and specifying the detected current position or a position derived therefrom as a central position for a subsequent iteration of the set of steps of the method, when the spatial distance exceeds the predetermined distance threshold, wherein the predefined functionality comprises blocking or removing at least one functionality of the object,
wherein the predefined functionality further comprises issuing or transmitting at least one of a notification and a current position to a remote party,
wherein within subsequent iterations of the steps, the method further comprises: suppressing outputting of a further notification when, in several prior iterations, it is determined during checking that the spatial distance that has been determined exceeds a predetermined distance threshold, and when, within one or more preceding iterations, a defined number N, with N≥1, of notifications have already been output in the prior iterations, each of which having indicated that the distance threshold has been exceeded, and
wherein a triggering of a respective further iteration takes place when any condition from the following group or a predetermined subset thereof is detected:
activation or deactivation of a power supply or of an operational mode of the object;
expiry of a predetermined period of time since a defined reference point in time;
a predetermined point in time; and
occurrence of a handover to another mobile radio cell relating to a mobile radio connection with a mobile radio network existing in relation to the object or its associated monitoring device.

11. The system of claim 10, further comprising:
a man-machine interface that is configured to:
provide a facility for configuring, by at least one user input, a position monitoring, to be performed by the system of an object to be monitored; and
issue a notification initiated by the system in the course of the performance of the method.

12. A computer program operatively associated with a system comprising a data processing platform and one or more monitoring devices which are constructed to be separate from the data processing platform, each of which are arranged to detect a current position of an object, the computer program operative to cause the system to carry out a method comprising the following set of steps, which are carried out iteratively:

detecting a current position of the object;
determining a spatial distance of the current position from a position previously specified as a central position;
checking whether the spatial distance exceeds a predetermined distance threshold; and
triggering a predefined functionality of at least one of the object and the position monitoring system and specifying the detected current position or a position derived therefrom as a central position for a subsequent iteration of the set of steps of the method, when the spatial distance exceeds the predetermined distance threshold,
wherein the predefined functionality comprises blocking or removing at least one functionality of the object,
wherein the predefined functionality further comprises issuing or transmitting at least one of a notification and a current position to a remote party,
wherein within subsequent iterations of the steps, the method further comprises:
suppressing outputting of a further notification when, in several prior iterations, it is determined during checking that the spatial distance that has been determined exceeds a predetermined distance threshold, and when, within one or more preceding iterations, a defined number N, with N≥1, of notifications have already been output in the prior iterations, each of which having indicated that the distance threshold has been exceeded, and
wherein a triggering of a respective further iteration takes place when any condition from the following group or a predetermined subset thereof is detected:
activation or deactivation of a power supply or of an operational mode of the object;
expiry of a predetermined period of time since a defined reference point in time;
a predetermined point in time; and
occurrence of a handover to another mobile radio cell relating to a mobile radio connection with a mobile radio network existing in relation to the object or its associated monitoring device.

* * * * *

UNITED STATES PATENT AND TRADEMARK OFFICE
CERTIFICATE OF CORRECTION

PATENT NO. : 10,764,716 B2
APPLICATION NO. : 16/426284
DATED : September 1, 2020
INVENTOR(S) : Markus Neumann It is certified that error appears in the above-identified patent and that said Letters Patent is hereby corrected as shown below:

On the Title Page

Column 1, item (30) missing Foreign Application Priority Data, should read -- (30) Foreign Application Priority Data, May 30, 2018 (DE) 10 2018 112 909.2 --.

In the Specification

Column 9, Line 42, reads "interface MIMI, which in particular can be constructed by an" and should read -- interface MMI, which in particular can be constructed by an --.

In the Claims

At Claim 1, Column 15, Line 2, reads "more preceding iterations, a defined number N, with N>1, of" and should read -- more preceding iterations, a defined number N, with N$\geq$1, of --.

Signed and Sealed this
Twenty-ninth Day of December, 2020

Andrei Iancu
*Director of the United States Patent and Trademark Office*